US008795755B2

(12) United States Patent
Lien et al.

(10) Patent No.: US 8,795,755 B2
(45) Date of Patent: *Aug. 5, 2014

(54) SHELF-STABLE COOKING AID AND A PROCESS FOR ITS PREPARATION

(75) Inventors: Wen Sze Lien, Singapore (SG); Zhu Gao, Shanghai (CN); Yong Fu Wang, Shanghai (CN); Beatrice Lado, Saint-Andre de Cubzac (FR); Yan Xi Jin, Shanghai (CN); Nadji Rekhif, Pakistan (DZ); Christopher Brimelow, Leysin (CH)

(73) Assignee: Nestec S.A., Vevey (CH)

( * ) Notice: Subject to any disclaimer, the term of this patent is extended or adjusted under 35 U.S.C. 154(b) by 1188 days.

This patent is subject to a terminal disclaimer.

(21) Appl. No.: 12/281,924

(22) PCT Filed: Mar. 8, 2006

(86) PCT No.: PCT/EP2006/060564
§ 371 (c)(1),
(2), (4) Date: Oct. 18, 2010

(87) PCT Pub. No.: WO2007/101476
PCT Pub. Date: Sep. 13, 2007

(65) Prior Publication Data
US 2011/0104333 A1 May 5, 2011

(51) Int. Cl.
*A23L 1/22* (2006.01)
*A23L 1/227* (2006.01)
*A23L 2/56* (2006.01)
*A23L 1/39* (2006.01)

(52) U.S. Cl.
CPC .. *A23L 1/39* (2013.01); *A23L 1/227* (2013.01); *A23L 1/22091* (2013.01)
USPC .......................................... 426/534; 426/650

(58) Field of Classification Search
CPC ............................ A23L 1/227; A23L 1/2295
USPC ................................................ 426/534, 650
See application file for complete search history.

(56) References Cited

U.S. PATENT DOCUMENTS

| 2,426,634 | A | * | 9/1947 | Melnick ............................ 426/99 |
| 2,560,621 | A | * | 7/1951 | Wrenshall ....................... 426/574 |
| 3,433,650 | A | * | 3/1969 | Block et al. ...................... 426/99 |
| 3,578,465 | A | | 5/1971 | van der Zijen |
| 4,165,391 | A | | 8/1979 | Corbett nee Rolison |
| 5,053,234 | A | * | 10/1991 | Anderson et al. ............... 426/59 |
| 5,077,062 | A | * | 12/1991 | Ernster ............................ 426/46 |
| 5,679,397 | A | * | 10/1997 | Kuroda et al. ................. 426/650 |
| 6,024,990 | A | | 2/2000 | Kofoed et al. |
| 6,190,709 | B1 | * | 2/2001 | Schoenmaker et al. ........ 426/46 |
| 2004/0142090 | A1 | * | 7/2004 | Goral ............................ 426/650 |

FOREIGN PATENT DOCUMENTS

| CN | 1079370 | | 12/1993 |
| CN | 1118224 | | 3/1996 |
| CN | 1175367 | | 3/1998 |
| CN | 1201615 | | 12/1998 |
| CN | 1235520 | | 11/1999 |
| CN | 1430914 | | 7/2003 |
| DE | 3502983 | A1 * | 7/1986 |
| EP | 0 031 162 | | 1/1981 |
| EP | 1344459 | | 9/2003 |
| EP | 2208423 | | 7/2010 |
| KR | 10 2004 0040843 | | 5/2004 |
| KR | 20040040843 | | 5/2004 |
| WO | 96/16121 | | 5/1996 |
| WO | 9818343 | | 5/1998 |
| WO | 98/27828 | | 7/1998 |
| WO | WO03068002 | | 8/2003 |
| WO | WO2006/024464 | | 3/2006 |

OTHER PUBLICATIONS

Sabaf Spa v. MFI Furniture Centres Ltd., (2005) R.P.C. 10, pp. 209-219, downloaded from rpc.oxfordjournals.org on Mar. 21, 2011.
British Celanese Ltd v Courtlauds Ltd., Rep (1935), Reports of Patent, Design and Trademark Cases, vol. LII, No. 5, pp. 171-201.
International Search Report for International Application No. PCT/EP2006/060564 mailed on Jan. 23, 2007.
Written Opinion for International Application No. PCT/EP2006/060564 mailed on Jan. 23, 2007.
Abstract of Korean Patent No. KR 2004040843 A dated May 13, 2004.
"Abundance Ratios of Isotopes," Food Chemistry, Belitz-Grosch, Second Edition, pp. 797-799.
Cui Guiyou, "Flavor Nucleotides and Their Usage in Food" China Academinc Journal Electronic Publishing House, Chinese Cuisine Research, vol. 2, May 15, 1999, pp. 1-6—Abstract, http://www.cnki.net.
Matheis, "Flavor Modifiers", Food Flavorings, Chapter 11, pp. 367-405, XP008162467.
Loliger, "The Use and Utility of Glutamates as Flavoring Agents in Foods—Function and Importance of Glutamate for Savory Foods", J. Nutrition, 2000, pp. 915S-920S, Vol. 130, XP055064119.
Wikipedia, Definition of Umami, pages from httnp://en.wikipedia.org/wiki/Umami, XP055064125.

* cited by examiner

*Primary Examiner* — Jyoti Chawla
(74) *Attorney, Agent, or Firm* — K&L Gates LLP

(57) ABSTRACT

The invention concerns a shelf-stable concentrate cooking aid with increased Xian power comprising —a reduced amount of MSG, IMP and GMP, —food derived acids and sugars and —macromolecules, wherein all these components are of natural origin, said cooking aid comprising further up to 80% of added MSG or ribotides.

19 Claims, No Drawings

SHELF-STABLE COOKING AID AND A PROCESS FOR ITS PREPARATION

The present invention concerns a shelf-stable cooking aid and a process for its preparation.

In traditional cuisine and cooking, high flavour and delicious stocks are widely used. Such stocks or bouillons may be fish, meat or vegetables based are serve as basis for simmered dishes, stews, sauces, soups and other premium quality and tastefully dishes. Alternatively they can be added in such dished for imparting and/or enhancing deliciousness.

High quality stocks and bouillons are prepared by chefs in restaurant and by meal preparers in the home according to traditional recipes. Such stocks are obtained after a long preparation that includes slicing, cooking, boiling and simmering of selected tastefull ingredients such as meat, vegetables, bones, spices etc. . . . Such a preparation is long and cumbersome and eventually, the thus obtained products are not shelf-stable and need to be used within a short time. This is however the only way for chefs and consumers to obtain high quality stocks and bouillons with full bodyness, good mouthfeel and high flavour impact.

Besides that, many flavour and taste enhancers have been developed and are available in the trade. The food industry has developed a wide variety of ready to use flavour enhancer for various culinary applications. These may be concentrated bouillons in form of paste, powder, compressed cubes or granulates. The wide range of culinary base whether in the form of powder or paste is usually obtained by the precise mixing of tasty ingredients such as salt, sugars, sodium glutamate, spices and selected flavours all along mixed with a carrier.

The addition of these culinary additives helps to provide deliciousness and taste appealing properties to the food product in which they are added. Indeed, all around the world, the deliciousness is definitively perceived as the key attributes of high quality meals. This deliciousness is a subjective attribute and is usually described using different wording in the different countries based on the cultural background and on the culinary and cooking habits. The deliciousness can however be described as the property of a meal that makes it appealing to the taste and odour thanks to differents organoleptic properties such as fast flavor impact, blooming full bodied in mouth feel, lingering in taste while smooth in consistency and causing salivation. For example, according to asian preferences, the deliciousness and the attached organoleptic attributes have been described as the fifth taste, so called Umami. Monosodium Glutamate (MSG) has been described, in combination with interacting components such as nucleotides and NaCl as the principal responsible for the Umami taste. However, Umami may be sometimes found as uncomplete and somehow too chemical and also uncomfortable in the mouth. Umami has mainly been described in Japan and Japanese cuisine. On the other hand, Chinese cuisine, one of the most complex cuisine in the world, also comprises a taste description of deliciousness. In Chinese cuisine as well in Chinese mindset, the expression XIAN is the one that corresponds and describes to the best as deliciousness since it incorporates others dimensions as well as other sensory feelings compared to Umami. The so called XIAN expression is well understood and commonly used in Chinese culinary culture but its objective description and characterization still remains unclear since it seems to go beyond the umami dimension.

Flavour enhancers are commonly used in culinary applications. These flavors enhancers are added or a part of culinary products such as soup, sauces and meals and make them more taste appealing by giving them the deliciousness required by the consumers. The deliciousness is a culinary meaning relating to the overall feeling of a food product. The taste and flavor enhancement is known in any region in the world, from west to east and correspond to roughly the same organoleptic profile, rich in taste, full of bodyness etc. . . .

Taste enhancers are currently associated with umami and/or Xian sensations in Asian cuisine. On the other hand, there is no direct expression for this notion of Xian in western cuisine even though western stocks are also well known for their organoleptic properties that are exploited in many culinary applications.

While umami is well known and has been studied for a long time, xian remains less well defined in particular on a molecular level. However, Xian is a taste descriptor well understood and frequently used in Chinese culinary food culture, difficult to translate directly into Western languages. The direct translation of the two written characters which make up the word Xian is fish and goat, which indicates the complexity of the sensory experience. Like glutamate and umami, Xian components also enhance other flavours. Traditional Chinese high stocks, added to many different regional dishes to enhance flavour, are very high in Xian. Comparing Xian to glutamate or umami taste, Xian is far more complex, rounded and "comfortable", i.e. delicious, gratifying, agreeable. It is not unidirectional.

It is the object of the patent application PCT/EP2005/009242 to provide a shelf stable food composition that is useful to provide easily and conveniently the deliciousness to food preparations without chemical aftertaste of existing products. The basic idea sustaining this patent application is to provide a food composition that can be in any shelfstable and/or concentrated form and that may be used for seasoning meals and any type of savoury meals. Above the simple seasoning action, the food composition according to this patent application should also be usable for enhancing the taste in this fifth dimension whatever it is called, XIAN, deliciousness, fullbodyness or any other wording.

The patent application PCT/EP2005/009242 concerns a shelf-stable cooking aid comprising
a reduced amount of MSG, IMP (Inosine Monophosphate) and GMP (Guanosine Monophosphate),
between 10 and 20% in weight of food derived acids and sugars and
between 20 and 45% of macromolecules, wherein all these components are of natural origin.

The objective of the present invention is to enhance the Xian power of the above mentioned patent application.

The object of the present invention is a shelf-stable cooking aid comprising
a reduced amount of MSG, IMP (Inosine Monophosphate) and GMP (Guanosine Monophosphate),
food derived acids and sugars and
macromolecules, wherein all these components are of natural origin,
said cooking aid comprising further up to 80% of added MSG and ribotides (IMP and GMP).

The objective of the invention is to have a reduced content of non added MSG and ribotides together with an added amount of MSG and ribotides, as said before to enhance the Xian power.

It is possible according to the invention to have a meat version, a vegetarian version or a combination thereof. All the percentages given below are valid for all the 3 versions, unless specified on the contrary. They are in weight, based on the dry matter.

By reduced amount of MSG, IMP and GMP we understand, that compared with existing products, the content is at least twice lower. Under macromolecules, we understand polysaccharides, proteins and fats.

For determining the natural origin of these different components of the composition different techniques are possible. The most commonly used procedure is based on the isotopic 13C/12C ratio. For instance monosodium glutamate isolated from the product can be analysed using a Roboprep analyser coupled to a Europa 20-20 isotope ratio mass spectrometer which will chemically decompose MSG and the CO2 13C/12C isotope ratio is determined. In the case of a non natural MSG the 13C/12C isotope ratio will be lower than the for the natural one. The details concerning this type of measure is known from the man skilled in the art: see for example some details in Food Chemistry, Belitz-Grosch, Second Edition, pages 797-799, Abundance Ratios of Isotopes.

The food derived acids are taken from the group consisting of organic acids, amino acids and dipeptides. All the percentages in the present specification are given in weight.

The amino acids and dipeptides are mainly lysine, carnosine, asparagin, alanine, glutamine, phenylalanine, aspartic acid, ornithine with a minimum for glutamic acid. The organic acids are mainly lactic acid, citric acid, acetic acid and malic acid. For the vegetarian version, carnosine is not present.

As said before, the amount of MSG is reduced and is present in an amount of between 1 and 2%. Furthermore, the MSG is not an added MSG, but natural MSG, present on the base of the way of obtaining the cooking aid. The amount of IMP and GMP is comprised between 0.05 and 0.1%.

NaCl is also present in the cooking aid according to the invention. The salt can be present naturally or can be also added, depending on the type of process and on the version concerned. The amount of salt can vary broadly. The amount of salt can be highly reduced to very low amount.

The cooking aid further comprises between 8 and 20% of polysaccharides. These polysaccharides are taken from the group consisting of derived cellulose, pectin, locust bean gum, starch, alone or in combination. for the vegetarian version, the polysaccharide content is higher than for the meat version.

The shelf-stable cooking aid comprises further 8 to 20% of proteins. These protein are taken in the group consisting of collagen, gelatin, myosin, actin, alone or in combination. Gelatin, myosin and actin are more specific for the meat version.

Finally, the cooking aid contains further at least one carbohydrate selected from the group consisting of glucose, fructose, mannose, sorbitol, glycerol alone or in combination. For the vegetarian version, the sugar content is normally higher than for the meat version.

For the meat version, an important feature of the invention is the structure of the product in aqueous phase, which is totally different from the structure of an existing product on the market, as it can be better considered in relation with the below included drawings. As already mentioned above, the second important feature of the product according to the invention is the organoleptic characteristics.

Another feature of the invention in the meat version is the low amount of fat, which is comprised between 0.2 and 15%. More particularly, the cooking aid has a free fatty acid content comprised between 1.9 and 3.2%.

According to the feature of the invention, the normal addition of MSG and ribotides is up to 80%. Preferably the addition of MSG and ribotides is comprised between 20 and 50%. The MSG and ribotides can be pure MSG and ribotides, like products directly available on the market, for example in powder form. It is also possible according to the invention to add ingredients rich in MSG and ribotides. In this case, following components can be taken into consideration: all types of hydrolised proteins, like vegetable hydrolised proteins, cereal wheat gluten hydrolisate. It is also possible to add yeast extracts, soy sauce powder, wheat gluten sauce, fish hydrolysate.

The objective as already said before is to increase the taste enhancement effect.

Different forms of presentation can be considered for the shelf-stable cooking aid according to the invention. It is possible to have the composition in any physical form, like cube, powder, paste, concentrate, granule or liquid.

The present invention concerns further the use of a shelf stable concentrate cooking aid as described above, wherein the aid is comprised in culinary products taken from the group consisting of bouillons, sauces, dehydrated soups, liquid seasonings, snacks, prepared meals (chilled or frozen) in an amount comprised between 0.001 and 50% based on the total weight of said product. Fish sauces is included in the culinary area. The preferred added amount is comprised between 5 and 25%.

It is also possible according to the invention to use the shelf stable concentrate cooking aid in non culinary products, like sweet products. A non limitative example is cake or other dough products. The amount of addition of the cooking aid is the same as above.

The invention concerns further a process for the preparation of a shelf-stable cooking aid as described above, comprising the steps of milling the vegetables and/or the meat in mixture or separately, blanching the vegetables, hydrolysing the vegetables and/or the meat in mixture or separately, stopping the hydrolysis, concentrating Drying the mixture and mixing with the added MSG and ribotides.

Preparation of Stocks According to the Invention

Size reduction

Vegetables and meat are chopped or minced in a conventional apparatus blanching

Vegetables are water or steam blanched hydrolysing process

Meat and vegetables are enzymatically hydrolysed separately. The way of hydrolysing is according to the technique. The enzymes used are for example in the case of meat, proteases and in the case of vegetables, carbohydrases, for example cellulases stopping the hydrolysis.

The hydrolysis is stopped by inactivation of enzymes with temperature increase.

concentration

The resulting vegetables or meat hydrolysate is concentrated by evaporation.

According to the invention, it is either possible to proceed with only vegetables, or only with meat or with both vegetables and meat. In the last case, the process is carried out with meat and separately with vegetables: the concentration is done and finally the dry powders are mixed together.

Mixing

The final above mentioned product is mixed with the added MSG and ribotides to boost the Xian intensity at different ratios according to needs.

Concerning the type of meat to be used, there is no criticality: it is possible to use pork, veal, beef, lamb, chicken, duck and every other type of meat. It is also possible to use fish: in this case, every type of fish is possible. Sea food is included in the fish definition.

Concerning the vegetables, there is also no criticality: every type of vegetable can be used, like Europe type of vegetables or Chinese type of vegetables. For example, we can use carrots, tomato, bamboo, mushrooms, radish, celery, asparagus, cabbage, onion, soybeansprout.

According to a first embodiment of the process, after the end of the hydrolysis, the mixture is concentrated to form cubes or a paste. According to a second embodiment, after the end of the hydrolysis, the mixture is concentrated and dryed into a powder or granule.

Organoleptic Analysis of the Stocks Prepared According to the Invention.

The typical Xian organoleptic descriptors for deliciousness according to trained panel have been identified and listed as follows:

Fast Diffusion: corresponds to the first feeling that the consumer feels all over the mouth, Full Body: correspond to a well-balanced, appropriate levels of all flavour notes that result in a favourable, complete, mouth feeling sensation, Smoothness: correspond to a smooth coating on the tongue, Salivation: this correspond to the intensity of salivation that the product generates just after consumption Retention: this is the post-consumption feeling that the product leaves in the mouth.

These five descriptors have been identified and are used to characterized and to hierarchise the different products made with the different ingredients used in different concentration.

It is noticeable that many descriptors refers to organoleptic features that are in relation not only with the any taste but are related to a textural effect. For example retention refer a possible long interaction of the components of the stocks with the mouth mucus and epithelium on the tongue, where taste buds are located. So, one can notice that the deliciousness in the sense it is understood in the context of the present invention refers to a sensitive feeling that goes beyond the taste itself. The deliciousness may then be qualified as an interaction of taste with an occupation of the interior of the mouth thanks to an important or at least non-neglictible textural effect.

There are different ways to use the cooking aid according to the invention. In the case of cubes, a paste or a powder, it is possible to add the cooking aid on the meal or in the meal, in a quantity depending on the taste wanted by the consumer. Normally, the cooking aid is added or mixed with the meal in a quantity of from 0.001 to 50% based on the total weight of the meal.

The following examples illustrate the invention in more details.

Example 1

According to the invention, 1 kg of mushroom and 1 kg of ham are separately chopped and minced, respectively. The mushrooms are blanched and 9 kg of water, 10 g of cellulase and 10 g of protease are added to these mushrooms and hydrolysed at a temperature of 50-60° C. during 4 to 6 hours. The minced meat is also hydrolysed with 9 kg of water and 5 g of protease at a temperature of 60 C during 24 hours. By the end of the hydrolysis, the temperature is increased for meat and mushrooms hydrolysates to inactivate said enzymes. Both hydrolysates are concentrated by evaporation and vacuum drying to moisture of less than 5%: both powders are mixed together and with pure 25% of MSG and 5% of ribotides and 20% of ingredients rich in MSG and ribotides, such as all types of hydrolysed proteins, like vegetable hydrolysed proteins, cereal wheat gluten hydrolysate. It is also possible to add small amounts of yeast extracts, soy sauce powder, wheat gluten sauce.

Example 2

According to the invention, 1 kg of mushroom and 1 kg of bamboo shoots are separately chopped. The mushrooms and the bamboo shoots are blanched separately. Then, 9 kg of water, 10 g of cellulase and 10 g of protease are added to these mushrooms and hydrolysed at a temperature of 50-60° C. during 4 to 6 hours. The bamboo shoots are also hydrolysed with 9 kg of water, 10 g of cellulase and 10 g of protease at the same temperature and duration as for the mushrooms. By the end of the hydrolysis, the temperature is increased for bamboo shoots and mushrooms hydrolysates to inactivate said enzymes. Both hydrolysates are concentrated by evaporation and vacuum drying to moisture of less than 5%: both powders are mixed together and with pure 40% of MSG and 2.5% of ribotides and 20% of ingredients rich in MSG and ribotides, such as all types of hydrolysed proteins, like vegetable hydrolysed proteins, cereal wheat gluten hydrolysate. It is also possible to add small amounts of yeast extracts, soy sauce powder, wheat gluten sauce.

Example 3

The product according to example 1 is added into a dehydrated chicken bouillon and soup at a level of 10%. After reconstitution in hot water, the consumer has the perception of the five above mentioned Xian descriptors.

The invention claimed is:

1. A shelf-stable concentrate cooking aid comprising:
a reduced amount of Monosodium Glutamate, Inosine Monophosphate and Guanosine Monophosphate of natural origin, the reduced amount of Monosodium Glutamate between 1 and 2%, and the reduced amount of Inosine Monophosphate and Guanosine Monophosphate between 0.05 and 0.1%;
food derived acids and sugars of natural origin;
macromolecules of natural origin, wherein the macromolecules are selected from the group consisting of polysaccharides, proteins, fats, and combinations thereof; and
between 20% and 50% of an added ingredient selected from the group consisting of MSG, ribotides, and combinations thereof;
the shelf-stable cooking aid providing Xian sensory characteristics.

2. The shelf stable cooking aid of claim 1, comprising a free fatty acid content between 1.9 and 3.2%.

3. The shelf-stable cooking aid of claim 1, wherein the natural food derived acids are selected from the group consisting of organic acids, amino acids, dipeptides, and combinations thereof.

4. The shelf-stable cooking aid of claim 3, wherein the amino acids and dipeptides are selected from the group consisting of lysine, carnosine, asparagine, alanine, glutamine, phenylalanine, aspartic acid, ornithine, glutamic acid, and combinations thereof.

5. The shelf-stable cooking aid of claim 3, wherein the organic acids are selected from the group consisting of lactic acid, citric acid, acetic acid, malic acid, and combinations thereof.

6. The shelf-stable cooking aid of claim 1, wherein the macromolecules comprise between 8 and 20% of polysaccharides.

7. The shelf-stable cooking aid of claim 6, wherein the polysaccharides are selected from the group consisting of derived cellulose, pectin, locust bean gum, and starch, and combinations thereof.

8. The shelf-stable cooking aid of claim 1, comprising between 8 and 20% of proteins.

9. The shelf-stable cooking aid of claim 8, wherein the proteins are selected from the group consisting of collagen, gelatin, myosin, actin, and combinations thereof.

10. The shelf-stable cooking aid of claim 1, wherein the sugars are selected from the group consisting of glucose, fructose, mannose, sorbitol, glycerol, and combinations thereof.

11. The shelf-stable cooking aid of claim 1, wherein said cooking aid has a structure in the aqueous phase with molecular aggregates comprising coacervates formed by polysaccharides, proteins and fats having inclusion of aqueous phase.

12. The shelf-stable cooking aid of claim 1, wherein the amount of fat is between 0.2 and 15%.

13. The shelf-stable cooking aid of claim 1, in a physical form selected from the group consisting of cubes, powder, paste, granules, liquid, and combinations thereof.

14. A method for preparing a food product, the method comprising adding to an edible mixture a shelf stable concentrate cooking aid comprising a reduced amount of Monosodium Glutamate, Inosine Monophosphate and Guanosine Monophosphate of natural origin, food derived acids and sugars of natural origin, macromolecules of natural origin, and between 20% and 50% of an added ingredient selected from the group consisting of Monosodium Glutamate, ribotides, and combinations thereof, the reduced amount of Monosodium Glutamate between 1 and 2%, the reduced amount of Inosine Monophosphate and Guanosine Monophosphate between 0.05 and 0.1%, and the shelf stable cooking aid providing Xian sensory characteristics, in culinary products selected from the group consisting of bouillons, sauces, dehydrated soups, and liquid seasonings in an amount between 0.001 and 50% based on the total weight of said product.

15. A process for the preparation of a shelf-stable cooking aid, the process comprising:
producing a cooking aid comprising a reduced amount of Monosodium Glutamate, Inosine Monophosphate and Guanosine Monophosphate of natural origin, the reduced amount of Monosodium Glutamate between 1 and 2%, and the reduced amount of Inosine Monophosphate and Guanosine Monophosphate between 0.05 and 0.1%;
food derived acids and sugars of natural origin;
macromolecules of natural origin; and
between 20% and 50% of an added ingredient selected from the group consisting of Monosodium Glutamate, ribotides, and combinations thereof, the cooking aid providing Xian sensory characteristics, by the steps of
milling vegetables and/or meat in a mixture or separately,
blanching the vegetables,
enzymatically hydrolyzing the vegetables and/or the meat in mixture or separately,
stopping the hydrolysis,
concentrating,
drying the mixture; and
mixing with the added ingredient selected from the group consisting of Monosodium Glutamate, ribotides, and combinations thereof.

16. The process of claim 15, wherein after the end of the hydrolysis, the mixture is dryed into any physical form.

17. The process of claim 15, wherein the cooking aid is mixed with further ingredients to provide a product selected from the group consisting of bouillons, sauces, dehydrated soups, liquid seasonings, and combinations thereof.

18. A method for imparting and/or enhancing flavor in a meal comprising adding a natural cooking aid comprising a reduced amount of Monosodium Glutamate, Inosine Monophosphate and Guanosine Monophosphate of natural origin, food derived acids and sugars of natural origin, macromolecules of natural origin, and up to 80% of added Monosodium Glutamate or ribotides, the reduced amount of Monosodium Glutamate between 1 and 2%, the reduced amount of Inosine Monophosphate and Guanosine Monophosphate between 0.05 and 0.1%, the cooking aid providing Xian sensory characteristics, into the meal in a quantity of from 0.001 to 50% based on the total weight of the meal.

19. The method of claim 18 wherein the added Monosodium Glutamate or ribotides is 20% to 50% of the cooking aid.

* * * * *